Oct. 8, 1929.　　　E. A. MAHANNAH　　　1,731,054
ELECTRICAL CONTACT MECHANISM
Filed Dec. 21, 1926　　2 Sheets-Sheet 1
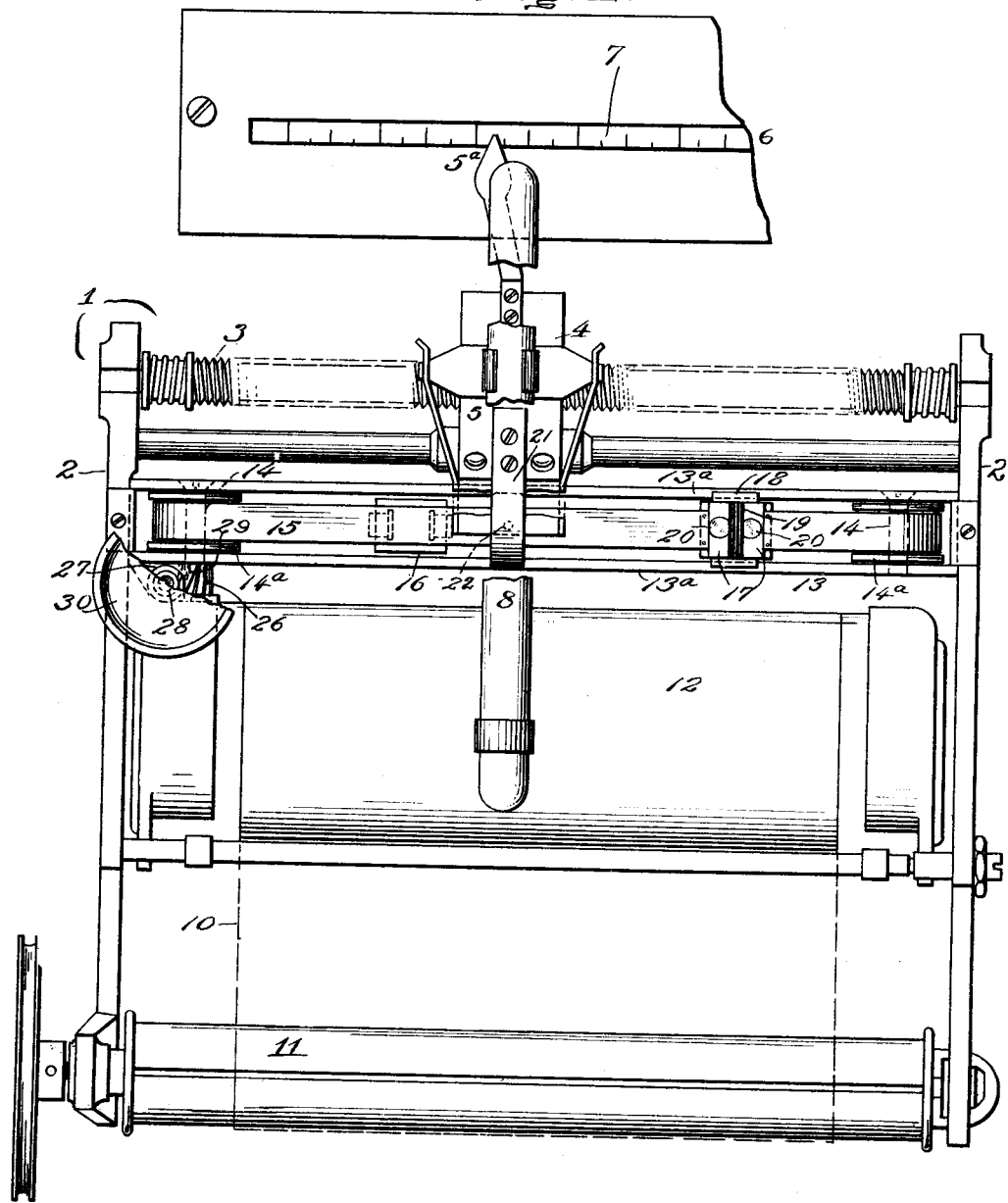

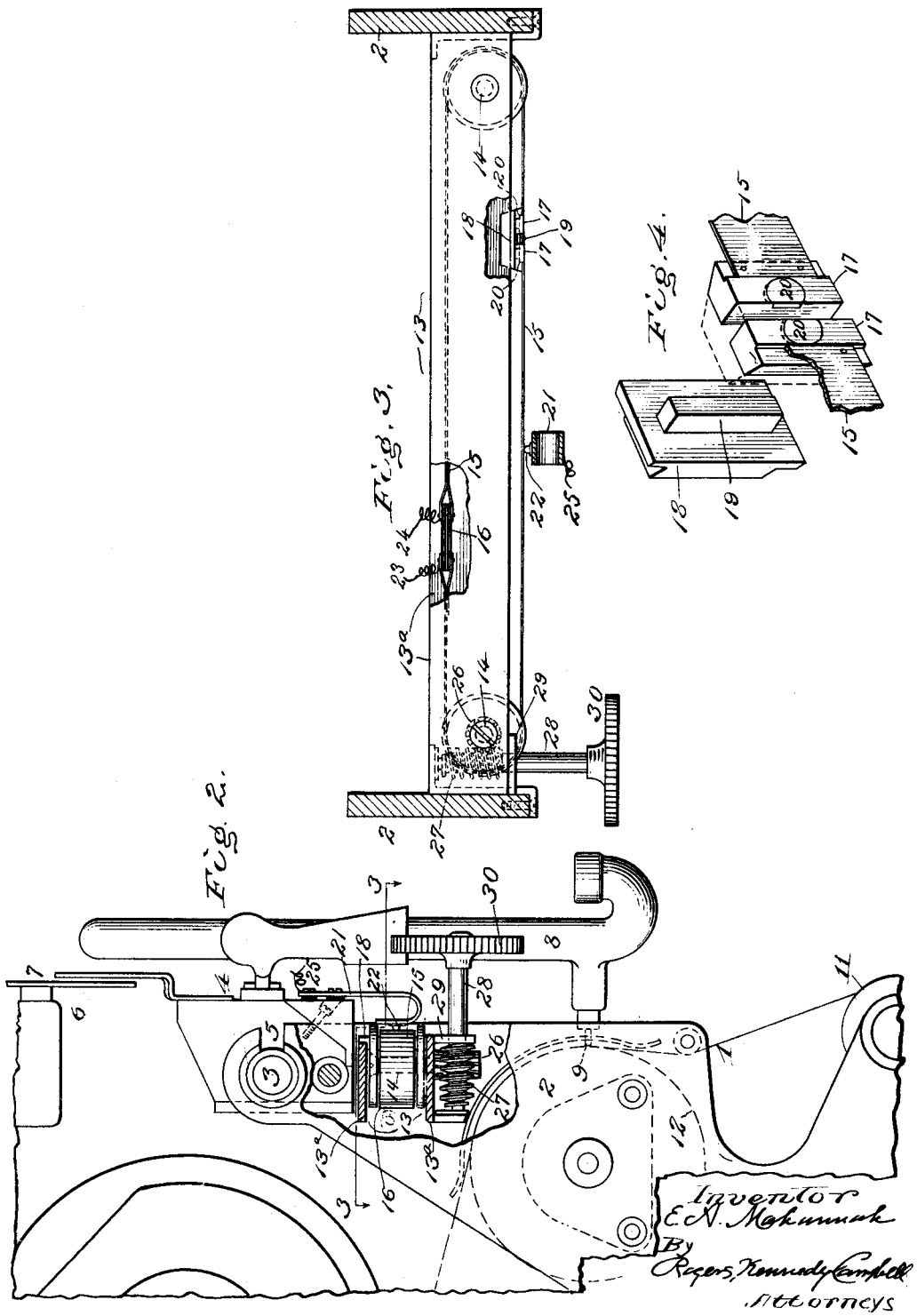

Patented Oct. 8, 1929

1,731,054

UNITED STATES PATENT OFFICE

EVERETT A. MAHANNAH, OF NEW YORK, N. Y., ASSIGNOR TO INTERNATIONAL PAPER COMPANY, A CORPORATION OF NEW YORK

ELECTRICAL CONTACT MECHANISM

Application filed December 21, 1926. Serial No. 156,217.

In the application of electric current controlling means for electric steam generators, the regulation of wood grinders, governor controls, and other electrically operated power consumers or units, it is usual to employ an electric meter operating on the relay principle, such for instance, as the well known Westinghouse graphic meter, wherein provision is made for making or breaking, as the case may be, electric contact at a certain point related to the scale of the instrument, by a traveling contact finger, so as to thereby complete a circuit or break a circuit according to the requirements and demands of the particular conditions to be controlled. In adapting such instrument to different characters and conditions of control, it is necessary to vary the point in the travel of the contact finger at which the circuit will be closed in one case or opened in another, and it has heretofore been necessary in order to meet these conditions, to make up special contact devices for each individual application of control, such contact devices being designed for the particular purpose desired; and when changes are required, or variations in the accuracy of the instrument occur which demand a change in the relative location on the scale of the contact devices, it has been necessary to reconstruct the instrument to meet the changed conditions.

In accordance with the present invention, means are provided for adjusting the point in the travel of the contact finger, where the latter opens a circuit or closes a circuit, the said adjustment extending preferably over the entire range of action or travel of the finger, so that the one instrument, without reconstruction or rebuilding, will be adapted to meet the varying conditions encountered in practice with respect to the different kinds of control to which it may be applied.

In the accompanying drawings:

Fig. 1 is a front elevation of such portions of an electric meter of the relay type necessary for the understanding of my invention, the same having my invention applied thereto.

Fig. 2 is a side elevation of the meter as viewed in the direction of the arrow in Fig. 1.

Fig. 3 is a horizontal section on the line 3—3 of Figs. 1 and 2.

Fig. 4 is a detailed perspective view of the meeting ends of the adjustable band with the two fixed contact points.

Referring to the drawings:

1 designates the frame of an electric meter, which frame comprises the two upright frame bars or plates 2 suitably connected together to constitute a unitary frame structure. Mounted in the upper portion of the frame and rotatable therein by an electric motor (not shown) is a horizontal feed screw 3 engaged by a feed nut 4 on a traveling carriage 5, the arrangement being such that by the rotation of the feed screw respectively in opposite directions, the carriage will be caused to move back and forth horizontally of the frame. At its upper end the carriage is equipped with a pointer 5 adapted to be read in connection with graduations of a scale 6 on a vertical plate 7 fastened to the frame; and depending from the carriage is a recording pen 8 formed with a pen point 9 making contact, so as to mark thereon, with a record sheet 10, which is unwound from a supply roll 11 by a suitable clockwork mechanism (not shown) and is wound up on a winding roll 12, the said supply roll and winding roll being suitably journaled in the side frame bars 2.

The instrument above briefly described is a commercial form of watt meter whose construction and operation are familiar to those skilled in the art, and reference has been made in detail to only those parts which are necessary to an understanding of the present invention, which is illustrated by way of example as applied to an instrument of this type, although it is applicable as well to other forms of electric meters where the conditions of application and use, require changes in the point where contact is made by the traveling contact member of the mechanism.

In applying my invention to an electric meter of the type described, I fasten to the frame bars 2 below the carriage and in the rear of the recording pen, a horizontal open supporting frame 13 comprising upper and lower rails or plates 13ª. Carried by vertical studs 14 journaled in the opposite ends of the frame plates 13ᵃ, are rollers or pulleys 14ᵃ located between the plates, around which pulleys passes a thin metallic endless band or support 15. The rear stretch of this band is divided vertically and the free ends thereof fastened respectively to the ends of a plate 16 of insulating material, whereby the ends of the band are insulated from each other at this point. The front stretch of the band is likewise divided vertically, and the free ends thereof fastened respectively to brass plates 17, 17, fixed in spaced relations to a block 18 of insulating material, on either side of a transverse rib 19 projecting outwardly from the central portion of said block, the provision of the two insulating blocks in the front and rear stretches of the band, dividing the band into two parts or sections insulated from each other. An electric contact point 20 is set in each of the plates 17, in spaced relations to each other, which contacts, in the present instance, are made of tungsten, and the outer faces of these contact points are flush with the face of the band and with the face of the rib, for the purpose presently to be described. A contact member in the form of a finger 21 is fixed to and insulated from the carriage 5 in rear of the recording pen, and is provided with a contact point 22, adapted, in the travel of the carriage, to traverse the face of the band and make electrical contact with the spaced contact points 20 to control certain electric circuits, the conductors of which are shown in the present example of the invention as being connected to the ends of the band at the rear stretch of the same as as 23 and 24, and to the contact finger as at 25.

According to the character and conditions of control for which the instrument may be employed, it becomes necessary to vary the point in the travel of the contact finger, where contact will be made with the contact points 20, and this is effected in accordance with my invention by adjusting the contact points 20 by a shifting movement of the band, so as to move the block 18 and the contact points 20 carried thereby, to different positions in the direction of movement of the contact finger. This shifting movement of the band is effected in the present instance by turning one of the pulleys, around which the band passes, in the present case the pulley at the left in Fig. 1, which has its supporting stud extending downwardly through the lower frame plate 13ᵃ, and has fixed to its end a vertical worm wheel 26. The worm wheel is engaged by a horizontal worm 27 on a shaft 28 mounted in bearings in brackets 29 depending from the said frame plate 13ᵃ and the outer end of the shaft has fixed to it an adjusting head or wheel 30 for turning it.

From the construction described it will be understood that by turning the wheel 30 in one direction or the other, the pulley connected therewith will be caused to rotate and will shift the band, thereby moving the contact points to the right or left and enabling them to be adjusted to the particular point in the range of travel of the contact finger, desired. Further it will be understood that due to the ability to adjust the contact points as described, varying conditions encountered in practice requiring the different location of the contact point where the contact finger makes or breaks the circuits, may be met by merely turning the adjusting wheel 30 as before described, thereby avoiding the necessity heretofore existing of remodelling or reconstructing the instrument, or building a different one, for the different conditions and uses met with.

While in the foregoing description and accompanying drawings I have set forth the invention in the particular detailed form which I prefer to adopt, it will be understood that these details may be variously changed and modified by the skilled mechanic without departing from the spirit of the invention; and further it will be understood that the invention is not limited to any particular form or construction of the parts except in so far as such limitations are specified in the claims.

Having thus described my invention, what I claim is:

1. In an electrical contact mechanism, the combination of a traveling contact member, a contact point with which said member is adapted to cooperate in controlling an electric circuit, an endless band on which said contact point is mounted, suitable supports on which said band is movable in the direction of travel of the contact member, and means for adjusting said band to different positions in its line of movement.

2. In an electrical contact mechanism, the combination of a traveling contact member, a contact point with which said member is adapted to cooperate in controlling an electric circuit, a band on which the contact point is mounted, pulleys supporting said band, and means for rotating one of the pulleys to shift the band and thereby adjust the position of the contact point.

3. In an electrical contact mechanism, the combination of a traveling contact member, a contact point with which said member is adapted to cooperate in controlling an electric circuit, a band on which the contact point is mounted, pulleys supporting said band, and an adjusting wheel geared to one of the pulleys to rotate the same; whereby the band may be shifted and the contact point adjusted relative to the contact member.

4. In an electrical contact mechanism, the combination of a traveling contact member, a support movable in the direction of travel of said member, and spaced contact points on said support fixedly related to each other and adapted to be engaged by the contact member in the travel of the latter; whereby by moving said support, the contact points may be adjusted relative to the contact member without changing their fixed relations.

5. In an electrical contact mechanism, the combination of a traveling contact member, a metallic supporting band comprising two connected parts or sections insulated from each other, spaced contact points mounted in electrical contact with the respective sections of the band and in position to be engaged by the traveling contact member, and means for shifting the band to adjust the contact points to different positions in the direction of travel of the contact member.

6. In an electrical contact mechanism, the combination of a traveling contact member, a metallic supporting band, an insulating block connected with the ends of said band to insulate said ends from each other, spaced contact points carried by the block and electrically connected respectively with the ends of the band, said contact points and the portions of the band leading therefrom being in position to be traversed by the said contact member, and means for shifting the band to vary the position of the contact points in the direction of travel of the contact member.

7. In an electrical contact mechanism, the combination of a traveling contact member, a contact point with which said member is adapted to cooperate in controlling an electric circuit, a flexible support for said contact point, and means including pulleys for sustaining and adjusting said flexible support whereby to vary the position of the contact point with reference to the direction of travel of the contact member.

In testimony whereof, I have affixed my signature hereto.

EVERETT A. MAHANNAH.